Patented Nov. 19, 1940

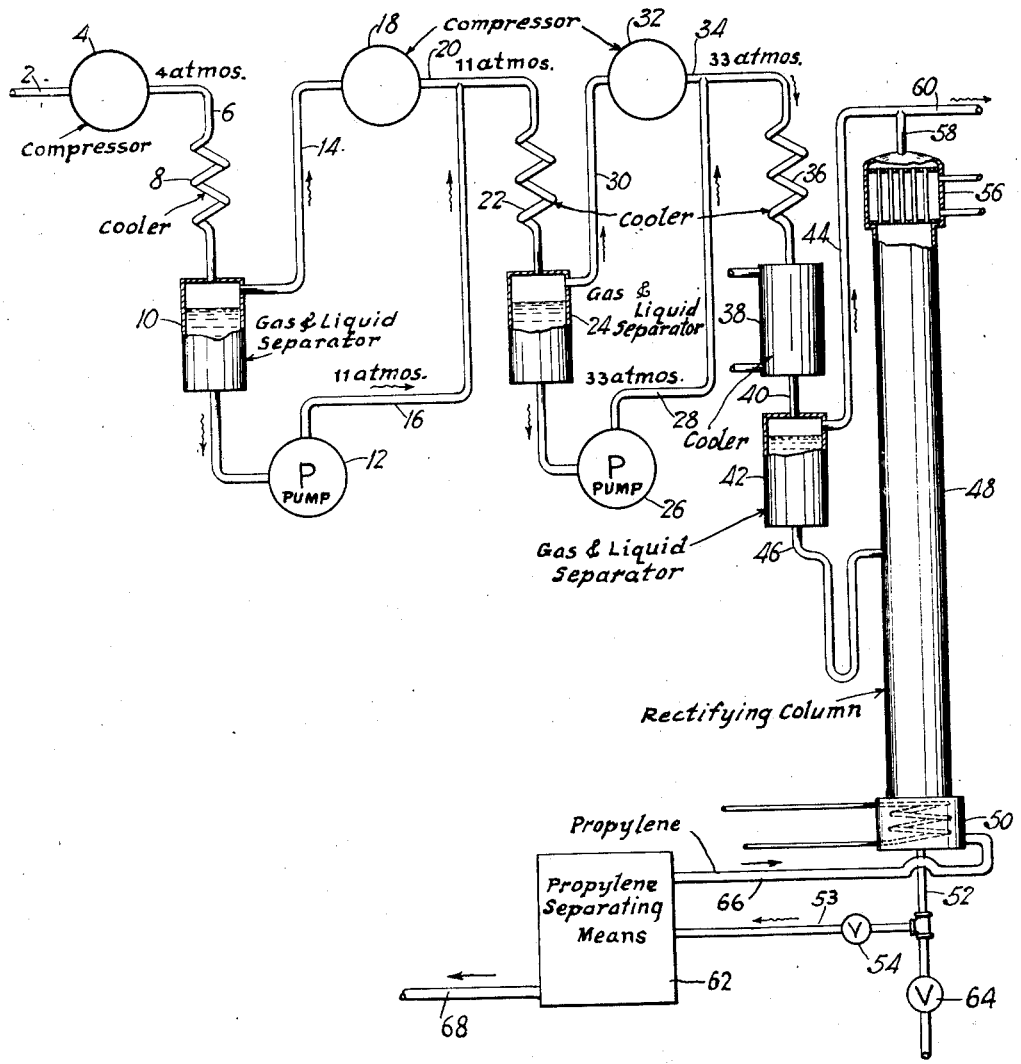

2,222,275

UNITED STATES PATENT OFFICE 2,222,275

PROCESS FOR THE SEPARATION OF HYDROCARBONS

Dale F. Babcock, Wilmington, Del., assignor to E. I. du Pont de Nemours & Company, Wilmington, Del., a corporation of Delaware Application October 14, 1937, Serial No. 168,890

6 Claims. (Cl. 196—7)

This invention relates to a process for the purification of normally gaseous mixtures, and more particularly to the purification of the gaseous products produced by the cracking of petroleum, and still more particularly to the separation of a gaseous hydrocarbon mixture into a gaseous fraction containing predominantly propylene and more volatile components and into a liquid fraction containing predominantly propylene and less volatile components.

The pyrolysis of petroleum materials, as practiced in commercial vapor phase cracking operations, produces both liquid and gaseous products. These cracked gases are usually saturated with materials boiling in the gasoline range which must be recovered prior to use of the gas in other processes or for fuel.

In the gasoline refining industry this recovery of gasoline is often effected by compressing the cracking gas to a moderate pressure, cooling, and thereby liquefying a portion of its gasoline content. The uncondensed gases, still under pressure, are then forced up through a scrubbing tower, countercurrent to a light oil which scrubs the remaining gasoline from the fixed gases. The low-boiling gasoline is then distilled from the "fat" oil, which is then recycled to the scrubbing operation. The distillate is joined with the liquid fraction separated after compression, and the mixture is introduced into a stabilizing column where the low-boiling components which are too volatile to be used in gasoline are distilled off. I have found it much more expedient to recover and to stabilize the gasoline content of the cracked gas in a different manner.

This invention has as its object the separation of a normally gaseous hydrocarbon mixture into a gas fraction containing predominantly propylene and more volatile components and into a liquid fraction containing predominantly propylene and less volatile components. A further object is to obtain this separation with a minimum expenditure of power. A still further object is to reduce the water content of the gaseous fractions significantly below that existing in the original mixture. Another object is to provide an apparatus for the accomplishment of the above ends. Other objects will appear hereinafter.

These objects are accomplished by processing a hydrocarbon gas according to one or more of the following steps in combination.

(1) The gas is compressed to about 33 atmospheres using two or more stages. When three stages are used the intermediate stages are suitably about four and about eleven atmospheres respectively.

(2) The liquids condensed on interstage cooling are separated from the gas and combined with the effluent from the next higher compression stage.

(3) The gas and liquid mixture obtained at 33 atmospheres is cooled to such a temperature that an appreciable quantity of $C_3$ hydrocarbon is condensed.

(4) This liquid is separated from the vapor and rectified so that the resulting liquid is essentially ethane free.

The accompanying drawing represents diagrammatically a complete apparatus for the separation of the components of the fluid mixture referred to above. Reference will be made to this drawing in order to properly describe the invention. It is to be undertsood that the details of this apparatus, which are well known to those skilled in the art, have been omitted for the sake of clarity and the modifications in the details of construction and in arrangement of parts may be made without departing from the spirit of the invention.

The hydrocarbon vapor to be processed enters the system through conduit 2 at approximately atmospheric pressure. The gas is compressed in compressor 4 to approximately 4 atmospheres absolute, and it is passed through conduit 6 and water cooler 8 into separator 10 where the condensed liquid is separated from the gas. The gas free of condensed liquid is passed through conduit 14 to compressor 18 where its pressure is increased to approximately 11 atmospheres. The liquid from separator 10 is forced by pump 12 through conduit 16 into conduit 20 where it mixes with the compressed vapors from compressor 18. This combined gas and liquid mixture is passed through water cooler 22 and the condensed liquid separated from the gas in separator 24. The gas is passed through conduit 30 into compressor 32 where its pressure is raised to approximately 33 atmospheres. The liquid in separator 24 is forced by pump 26 through conduit 28 into conduit 34 where it combines with the effluent from compressor 32. The combined liquid and gas is cooled in water cooler 36 to approximately room temperature and further cooled to nearly 0° C. in cooler 38 which is supplied with a suitable refrigerant. The cooled fluid from cooler 38 is conducted via conduit 40 to the gas and liquid separator 42. The gas is separated from the liquid in separator 42, the gas passing through conduits 44 and 60 and out of the system. The liquid from separator 42 passed through conduit 46 into rectifier 48. The calandria 50 at the base of this rectifier is heated using high pressure steam or other media so that essentially all of the ethane and more volatile components are expelled from the liquid. Condenser 56, located at the top of rectifier 48, is cooled to nearly 0° C. using a suitable refrigerant. The non-condensable gas leaving the top of the rectifier through conduit 58 is combined with the gas from separator 42 which passes through conduit 44 and passed out of the system through conduit 60. The liquid is conducted via conduit 52 from the base of the rectifier and is expanded through valve 64 and may be either further rectified in suitable equipment or stored in tanks.

In order to avoid polymerization or gum formation in the calandria 50, the boiling temperature existing within said calandria may be reduced from 10 to 20° C. by the addition of propylene thereto. This propylene may be obtained from the liquid conducted via conduit 52 by drawing off some or all through conduit 53. This can be accomplished by the adjustment of valves 54 and 64.

The liquid so conducted is introduced into propylene separating means 62 and the propylene so separated recycled through conduit 66 to calandria 50. The resulting liquid from which the propylene has been separated is removed via conduit 68 for further treatment.

The propylene may be separated by any conventional method such as expanding the liquid containing same into a flash chamber and recompressing the off-gas to condense same prior to returning to the calandria, or by fractionally distilling so as to obtain a liquid propylene fraction.

*Example*

A gas of the following composition prepared by the vapor phase cracking of petroleum was used as the crude material for the operation of this invention.

| Composition: | Mol per cent |
|---|---|
| Hydrogen | 11.0 |
| Methane | 17.5 |
| Ethylene | 22.0 |
| Ethane | 13.5 |
| $C_3$ hydrocarbons | 19.0 |
| $C_4$ hydrocarbons | 5.5 |
| $C_5$ hydrocarbons | 3.5 |
| $C_6$ hydrocarbons and higher hydrocarbons | 8.0 |
| Total | 100.0 |

The components of this gaseous mixture less volatile than ethane were essentially olefinic in character. Cyclic compounds such as benzene and toluene were also known to be present. The crude gas of the above composition was compressed to 4 atmospheres and cooled to 35° C. Liquid amounting to some 5 mol per cent of the total gas and having the following composition was condensed by this operation.

| Composition: | Mol per cent |
|---|---|
| Propylene and lighter hydrocarbons | 5 |
| $C_4$ hydrocarbons | 5 |
| $C_5$ hydrocarbons | 10 |
| $C_6$ hydrocarbons and heavier hydrocarbons | 80 |
| Total | 100 |

The gas at 4 atmospheres was compressed to 11 atmospheres, combined with the liquid condensed in the first stage after-cooler and the resulting mixture cooled to 35° C. This operation condensed 15 mol per cent on the crude gas. The liquid has the following composition:

| Composition: | Mol per cent |
|---|---|
| Ethylene and lighter hydrocarbons | 7 |
| $C_3$ hydrocarbons | 16 |
| $C_4$ hydrocarbons | 14 |
| $C_5$ hydrocarbons | 16 |
| $C_6$ and heavier hydrocarbons | 47 |
| Total | 100 |

The gas at 11 atmospheres was compressed to 33 atmospheres, combined with the liquid condensed at 11 atmospheres and the mixture cooled to 5° C., at which temperature some 48 mol per cent of the original gas had been liquefied. This liquid had the following composition:

| Composition: | Mol per cent |
|---|---|
| Methane | 6.2 |
| Ethylene | 19.1 |
| Ethane | 14.3 |
| $C_3$ hydrocarbons | 27.4 |
| $C_4$ hydrocarbons | 9.8 |
| $C_5$ hydrocarbons | 6.7 |
| $C_6$ and heavier hydrocarbons | 16.5 |
| Total | 100.0 |

This liquid was rectified at 33 atmospheres and a tails product produced at +130° C. which amounted to some 26 mol per cent of the crude gas and had the following composition:

| Composition: | Mol per cent |
|---|---|
| Ethane | 0.2 |
| $C_3$ hydrocarbons | 40.0 |
| $C_4$ hydrocarbons | 17.6 |
| $C_5$ hydrocarbons | 12.2 |
| $C_6$ and heavier hydrocarbons | 30.0 |
| Total | 100.0 |

Reflux in the rectifier was produced by a condenser which lowered the temperature of the gas leaving the top to +5° C. This vent gas had the following composition:

| Composition: | Mol per cent |
|---|---|
| Methane | 13.9 |
| Ethylene | 42.7 |
| Ethane | 31.9 |
| $C_3$ hydrocarbons | 11.5 |
| $C_4$ hydrocarbons | 0.0 |
| Total | 100.0 |

The vent gas was combined with the high pressure gas leaving the separator, producing a fraction which amounted to some 74 mol per cent of the crude gas. This gas fraction had the following composition:

| Composition: | Mol per cent |
|---|---|
| Hydrogen | 15.0 |
| Methane | 23.9 |
| Ethylene | 30.1 |
| Ethane | 18.4 |
| $C_3$ | 11.1 |
| $C_4$ | 1.1 |
| $C_5$ | 0.4 |
| Total | 100.0 |

All gas compositions given above were on a dry basis. Actually the crude gas entering the system was saturated with water vapor and contained approximately 3 mol per cent of water. After compressing to 33 atmospheres and cooling to 35° C. the water content of the vapor was reduced to approximately one tenth of one per cent and was further reduced to nearly three one-hundredths of one per cent by cooling the gas to +5° C. The water that was condensed with the various gasoline fractions was allowed to carry on through the system along with the liquid products and was removed along with the hydrocarbon liquids from the base of the rectifier.

The above described compression system employs three stages in order to raise the pressure of the gas to that desired. A less or a greater number of compression steps may be used without departing from the spirit of this invention. The final pressure employed in the above example was 33 atmospheres. The pressure used in any given case will in a measure depend upon the disposition to be made of the cold gases leaving the final separator and rectifier. For gas mixtures of composition similar to those given above the final pressure stage is from about 30 to 35 atmospheres absolute but somewhat higher or lower pressures are operable and are of advantage in some cases.

In order to obtain maximum propylene condensation, it is desirable to use a low temperature in the refrigerated cooler, that is, a temperature below 25° C. The temperature of 5° C. used in the example was chosen since it is sufficiently above 0° C. that ice formation is not encountered, and it is sufficiently cold to condense adequate quantities of propylene. If, for example, it is not desired to condense propylene but butylene is desired as the most volatile component in the liquid produced at the base of the rectifier, higher temperatures than +5° C. may be employed.

In order that a larger proportion of the propylene may be withdrawn with the liquid from the base of the rectifier, butylene or a less volatile hydrocarbon may be pumped into the gas stream prior to cooling in the low temperature cooler. This recycled hydrocarbon may be conveniently obtained by distilling the tails liquid from the rectifier, removing the propylene, and recycling the resulting material.

With certain gas compositions, difficulty is experienced due to polymerization or gum formation in the calandria of the rectifier which in the above example is heated to approximately +130° C. To avoid such polymerization the boiling temperature existing within this calandria may be reduced by some 10° to 20° C. without contamination of the resulting liquid with ethane and lighter boiling material if additional propylene is recycled into the calandria.

The process and apparatus disclosed herein may be used for the separation of other fluid mixtures into a gas component and a liquid component. This invention, however, is most usefully employed as a separate processing step prior to the liquefaction of a hydrocarbon gas for the production of pure ethylene by methods similar to those described in copending application Serial No. 30,030, filed July 5, 1935.

In the process described herein the liquid contains not only gasoline but also substantial quantities of butylene and propylene; thus the total volume of gas to be processed in the liquefaction system is reduced by some 26%, over a process in which the gasoline fraction is separated free of lower boiling components. Since the low temperatures required in the liquefaction system are costly to produce, any reduction in the volume of material handled produces attractive savings.

The liquid produced at the base of the rectifier contains as its most volatile component, proylene. For this reason, the removal of this material as a pure fraction in the subsequent distillation step can be accomplished in a single step.

The method of propylene and gasoline recovery described herein also gives preliminary drying of the gas; e. g., the water content of the gas is reduced to its equilibrium vapor pressure at approximately 0° C. Under these conditions the gas may be passed directly into a heat exchanger and further cooled to, say, approximately −50° C., and the volume of water condensed to a solid will be relatively small, thus allowing a long time interval before thawing is required.

As many apparently widely different embodiments of this invention may be made without departing from the spirit and scope thereof, it is to be understood that I do not limit myself to the specific embodiments thereof except as defined in the appended claims.

I claim:

1. A process for the separation of the gaseous hydrocarbon mixture produced by the cracking of petroleum hydrocarbons into a gaseous fraction containing predominantly propylene and more volatile components and a liquid fraction containing predominantly propylene and less volatile components which comprises compressing said cracked gaseous petroleums to a pressure of about 3 atmospheres, cooling said gas to room temperature and separating any condensed liquid from the uncondensed gases, compressing the uncondensed gases thus separated to a pressure of about 11 atmospheres, combining with the compressed gas the liquid separated in the preceding gas and liquid separation step, cooling the resulting mixture to room temperature and separating the liquid fraction from the gaseous fraction, further compressing the separated gaseous fraction to about 33 atmospheres, combining with said gaseous fraction the liquid from the second gas and liquid separation step, cooling the resulting fluid mixture to about +5° C. and separating the liquid fraction from the gaseous fraction, rectifying the liquid fraction at a pressure of about 33 atmospheres by countercurrent flow of reflux liquors, by boiling the liquid at the base of the rectifying column at a temperature of about 130° C., and condensing the reflux liquors at the top of said column at a temperature of about +5° C.

2. The process which comprises compressing in at least two stages to a pressure of about 33 atmospheres in the last stage a gaseous mixture produced by the cracking of a petroleum hydrocarbon and comprising ethane and propylene, cooling and separating condensed liquid between the compression stages, combining the liquid thus separated on interstage cooling with the effluent from the next higher compression stage, cooling the mixed liquid and effluent from the last compression stage to a temperature sufficient to condense an appreciable quantity of the three carbon atom hydrocarbon, separating this condensed liquid from the gas and rectifying the liquid out of contact with the previously separated gas under conditions which will result in a liquid fraction substantially free of ethane, separating propylene from the final liquid fraction and recycling same to the fractionating system.

3. The process which comprises compressing in at least two stages a gaseous hydrocarbon mixture of composition similar to that produced by the cracking of petroleum hydrocarbons and containing propylene, cooling and separating condensed liquid between the compression stages and combining the liquid thus separated on interstage cooling with the effluent from the next higher compression stage, cooling the mixed liquid and effluent from the last compression stage to a temperature sufficient to condense an appreciable quantity of the three carbon atom hydrocarbon, separating the condensed hydrocarbons from the gaseous hydrocarbons and fractionating said condensed hydrocarbons out of contact with the previously separated gaseous hydrocarbons under conditions which will eliminate the said previously separated gaseous hydrocarbons dissolved therein, then separating propylene from the final liquid fraction and recycling same to the fractionating system.

4. The process in accordance with claim 3 characterized in that the gaseous fraction obtained by the rectifying step is combined with the gaseous fraction from the last gas and liquid separation step.

5. The process which comprises compressing in at least three stages a gaseous hydrocarbon mixture containing propylene, lower boiling gaseous components, and polymerizable hydrocarbons, cooling the compressed gases and separating any condensed liquid therefrom between each of the compression stages, combining the liquid thus separated on interstage cooling with the effluent from the next higher compression stage, cooling the combined effluent and liquid from the last compression stage to a temperature sufficient to condense an appreciable quantity of propylene and separating the resulting liquid from said mixture, fractionating the liquid fraction out of contact with the previously separated gas mixture under conditions that will eliminate any of the gas fraction dissolved therein and retain in the liquid fraction propylene, separating the propylene from this final liquid fraction and recycling same to the fractionating system.

6. The process in accordance with claim 5 characterized in that the gaseous fraction obtained by the rectifying step is combined with the gaseous fraction from the last gas and liquid separation step.

DALE F. BABCOCK.

CERTIFICATE OF CORRECTION.

Patent No. 2,222,275. November 19, 1940.

DALE F. BABCOCK.

It is hereby certified that error appears in the printed specification of the above numbered patent requiring correction as follows: Page 3, first column, line 6, for "35° C. The" read --35° C. the--; and second column, line 8, for "proylene" read --propylene--; and that the said Letters Patent should be read with this correction therein that the same may conform to the record of the case in the Patent Office.

Signed and sealed this 28th day of January, A. D. 1941.

(Seal)

Henry Van Arsdale,
Acting Commissioner of Patents.